United States Patent Office 3,631,152
Patented Dec. 28, 1971

3,631,152
ETHYLENE UREA TERMINATED PHENOLIC RESINS AND METHOD OF CURING SAME
Calvin K. Johnson, Palos Heights, and David R. Armbruster, Addison, Ill., assignors to CPC International Inc.
No Drawing. Original application Apr. 18, 1968, Ser. No. 722,220, now Patent No. 3,546,172, dated Dec. 8, 1970. Divided and this application June 17, 1970, Ser. No. 47,138
Int. Cl. C08g *5/18, 9/24*
U.S. Cl. 260—51.5   16 Claims

ABSTRACT OF THE DISCLOSURE

Phenolic resins terminated by more than one ethylene urea group and thus having more than one unreacted >NH group are disclosed. These resins find specific utility in such fields as adhesives, insulation, encapsulation, lamination, castings, building structures and the like. When such resins are formulated so that the basic phenolic structure to which the ethylene urea groups are attached has a molecular weight between about 100 and about 5000, curing of these resins may be effected almost instantaneously by a method which comprises contacting a resin-acid catalyst system with an aldehyde. Curing by this method may be accomplished at room temperature or at temperatures slightly elevated above room temperature.

---

This application is a division of the co-pending patent application, Ser. No. 722,220, filed Apr. 18, 1968, now U.S. Pat. 3,546,172, issued Dec. 8, 1970.

BACKGROUND OF THE INVENTION

The versatility of polymeric resins which may be cross-linked or cured has long been known. Generally speaking, these resins differ widely in their structural and compositional characteristics as well as in their physical and chemical properties. All of these resins, however, have one quality in common, their ability to be cured or cross-linked. For most industrially useful resins, curing requires the addition of extra ingredients (either additives or catalysts), extra steps, and /or heat to the system in order to achieve sufficient cross-linking of the resin to enable it to acquire its versatile characteristics. The necessity for these additions, of course, increases the cost of a resin and thus detracts from its economic competitiveness.

Because of the need to cure a resin and the added cost factors accompanying the curing process, the resin art has long sought resins which may be cured more easily, more quickly, and more economically to competitively useful polymeric resin products or articles of manufacture. In some instances the art has obviously failed, but in other instances, such as in the area of epoxy resin systems, the art has not only succeeded to a high degree but has in many specific instances developed new and improved methods for curing a particular polymer system as an outgrowth from its development of the resin per se.

SUMMARY OF THE INVENTION

This invention contemplates within its scope a unique group of curable polymeric resins which are versatile and easily cured into a variety of commercial products. As an outgrowth from the development of this resin group, and thus also included within the scope of this invention, is a unique method for curing the resins within this group in a rapid and highly advantageous manner.

Basically, the resins contemplated by this invention may be called ethylene urea terminated phenolic resins wherein the terminated ethylene urea groups are preferably of a number greater than one and the molecular weight of basic phenolic structure to which the ethylene urea groups are attached preferably ranges from about 100 to about 5000.

This group of resins, although curable by conventional techniques may be, when using the preferred resins, rapidly cured at room temperature by a unique process which comprises contacting a mixture of the resin and a curing catalyst with an aldehyde such as acetaldehyde, formaldehyde, propionaldehyde, and the like. Regardless of the curing technique effected, however, the resulting cured resin may be used in a wide variety of industrial environments hereinafter more fully disclosed.

DETAILED DESCRIPTION OF THE INVENTION

The novel polymeric resins according to this invention may be accurately described as ethylene urea terminated phenolic polymers or resins. These resins contain terminal ethylene urea groups in the polymer molecule and are characterized by the general formula:

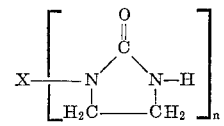

wherein X is generally representative of a phenolic structure and $n$ is preferably a number greater than 1. For reasons hereinafter more fully explained, the phenolic structures used preferably have a molecular weight between about 100 and 5,000.

Examples of phenolic structures useful for purposes of this invention are well known in the art and include that class of phenolic structures known as resole resins formed by the reaction of substituted or unsubstituted mono- or polyphenols with an aldehyde.

Examples of phenols which may be used to form the above-described resoles includes hydroxybenzene, methyl phenol, ethyl phenol, p-butyl phenol, o-isopropylphenol, p-allylphenol, acetylphenol, 4,4'-dihydroxydiphenylmethane, 2,2'-dihydroxydiphenylmethane, bis-phenol A and the like. In any event the resole resin should contain reactive methylol groups which are available for reaction with the ethylene urea. Examples of aldehydes which may be condensed with these phenolic compounds to form resoles useful in this invention include formaldehyde, acetaldehyde, and various dialdehydes such as glyoxal and the like. The aldehyde most generally used to react with the above phenolic compounds in order to form resoles is formaldehyde. This aldehyde is also especially preferred for purposes of this invention.

Resole formation techniques are conventional in the art and for purposes of this invention any of these techniques may be used to form the resoles useful herein. One technique especially preferred for forming phenolic-formaldehyde resoles comprises condensing a phenol as described above, with one or more moles and usually between 1.5 and 3.0 moles of formaldehyde per mole of phenolic hydroxyl group in the presence of or with the aid of an inorganic base such as NaOH or an organic tertiary amine catalyst.

The unique ethylene urea terminated phenolic resins of this invention may be prepared from the above-described materials by reacting them with ethylene urea. Ethylene urea is a well known compound generally characterized by the formula:

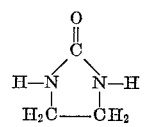

For example, when forming an ethylene urea terminated phenolic resin by reacting ethylene urea with a resole previously formed by the condensation of a phenol with formaldehyde, the following procedure may be conveniently used. Firstly, a phenol as described above (or mixtures thereof) is reacted with formaldehyde in the presence of a base (NaOH) or amine catalyst as indicated hereinbefore. To this resole is added ethylene urea and the mixture acidified. Preferably between about 0.6 and 1.5 moles of ethylene urea are employed per each mole of formaldehyde used in the preparation of the resole in the first step. The ethylene urea and resole are then reacted by the addition of heat to give an ethylene urea terminated phenolic resin. This resin may be separated, dried, etc. by conventional techniques and prepared in known ways for future commercial use. It is understood, of course, that the above procedure is applicable to resins from resoles generally and is not limited to the specific resole or resin described.

Various additives may be used with the unique resins of this invention to achieve further desired results. For example other urea compounds having two or more reactive >NH groups may be mixed with the resins of this invention or may be used to replace part of the ethylene urea in the synthesis of the unique resins as described above. Examples of such ureas include acetylene diurea, propylene urea, hydantoin, 4,5 - dihydroxyethylene urea and triazone.

Other additives which may be employed include such well known materials as plasticizers, modifies, and the like. Various other polymers such as resorcinol resins, phenolic resorcinol resins, phenolic resins, polyacrylamide co-polymers and the like may also be added to form mixtures or "alloys" of resins in order to achieve various characteristics in the final product. Likewise glycols and low molecular weight polyols may be incorporated into these systems.

The following examples, which are illustrative only and in no way limit the scope of this invention, set forth the best modes contemplated for making the unique resins described hereinabove. All parts are by weight except when otherwise specified.

EXAMPLE I

One hundred twenty parts of phenol, 170 parts of 37% formalin and 6 parts of a 50% water solution of NaOH are charged into a three-necked flask equipped with a stirrer, thermometer and reflux condenser. Heat is applied to the flask until a temperature of 75° C. is reached. The reaction temperature is then held until the free formaldehyde content of the resin fell to 2%. This resole is then cooled to 25° C. and adjusted to a pH of 4.5 with a 15% water solution of HCl. One hundred ninety parts of ethylene urea is then added to the resole, and the batch heated at 95° C. at a rate of 1° C. per minute. This reaction temperature is held for 2 hours. The resin is then cooled to 25° C. and the pH adjusted to 7.0 with a 25% water solution of NaOH. The resin is then dehydrated at 29 inches of vacuum until it has a viscosity of 950 cps. of 25° C. The final product has a solids content of 78% and a refractive index of 1.538 at 25° C.

EXAMPLE II

One hundred and fifty parts of phenol, 389 parts of 37% formalin and 121 parts of a 50% water solution of NaOH are charged into a 3-necked flask equipped with a stirrer and thermometer. Heat is applied to the flask until a temperature of 40° C. is reached. This reaction temperature is then held at 40° C. until the free formaldehyde content of the resin fell to 2%. This resole is then neutralized with $H_3PO_4$ to a pH of 7.0. The salt that forms is then removed by filtration and the resole is dehydrated to a refractive index of 1.580 at 25° C. Three hundred parts by weight of this resole, 110 parts by weight of water and 325 parts by weight of ethylene urea, are charged into a three-necked flask equipped with a stirrer and thermometer and heated to 40° C. The ethylene urea is allowed to dissolve and the pH of this mixture is then adjusted to 2.25 with a 15% water solution of HCl.

Heat is applied to the flask to raise the temperature to 95° C. at 1° C. per minute. This reaction temperature of 95° C. is maintained for 1 hour. The prepolymer is then cooled and dehydrated at 29 inches of vacuum to a 25° C. viscosity of 850 cps. This final product has a solids content of 75% and a refractive index of 1.529 at 25° C.

EXAMPLE III

To procedure of Example II is followed except that the formalin is replaced by 530 parts of a 40% water solution of acetaldehyde. The final product has a solids content of approximately 75%.

EXAMPLE IV

The procedure of Example II is followed except that the formalin is replaced by 1000 parts of a 40% solution of glutaraldehyde. An ethylene urea terminated phenolic resin is obtained.

EXAMPLE V

Two hundred twenty eight parts of bis-phenol A, 324 parts of 37% formalin and 41 parts of a 50% water solution of NaOH are charged into a three-necked flask equipped with a stirrer, reflux condenser and thermometer. Heat is applied until a temperature of 75° C. is reacted. This temperature is held until the free formaldehyde of the resin fell to 2%. The resole is cooled to room temperature and neutralized with $H_3PO_4$ to a pH of 7.0. The salt is removed by filtration and then 344 parts of ethylene urea and 100 parts of water added. The mixture is heated until a clear solution is obtained and the pH adjusted to 3.0 with dilute HCl. The mixture is heated to 95° C. and held at that temperature for 1 hour. Removal of the water at reduced pressure gives a solid ethylene urea terminated phenolic resin which is soluble in water.

EXAMPLE VI

Various polymers are made using the procedure of Example I, except that instead of phenol, meta-cresol, para-cresol, ethylphenol, and p-butylphenol are used. The final product formed in each instance is a curable ethylene urea terminated phenolic resin.

EXAMPLE VII

The procedure of Example I is followed except that the urea added is 95 parts of ethylene urea and 95 parts of propylene urea. The polymer obtained in an ethylene urea terminated phenolic resin having more than one unreacted >NH group therein.

As alluded to hereinabove, the resins of this invention as illustrated by the examples just set forth may be readily molded and cured into a wide variety of commercial products. This is usually accomplished by placing the uncured resin in a suitable mold or extruder and shaping it into a desired article. Thereafter the resin is cured or set by any conventional technique and the article is removed from its mold etc. Conventional curing techniques usually involve the addition of a catalyst, a curing agent, and heat to the system in order to effect a cross-linking of the molecular chains of the resins. Such conventional techniques, when adapted so as to provide an acid such as sulfuric acid, trifluoracetic acid, ammonium chloride, boron trifluoride etherate and the like as a catalyst and an aldehyde such as formaldehyde, glyoxal, glutaraldehyde or an aldehyde-providing curing agent such as paraformaldehyde, hexamethylene tetramine and the like, have proved useful as hot curing techniques for providing cured articles of the resins of this invention. It has now been found, however, that if a particular type of resin within the broad class of resins of this invention is provided, a novel curing technique may be used which is extremely rapid and yet does not require the expensive and time consuming addition of heat to the system. Such a novel curing technique, because it does not require the addition of heat to a system but rather can effect a rapid cure of a resin at room temperature (68°–78° F.) or below, is properly defined as a "cold-setting" technique.

The resins which may be cured by this technique are those resins as described above wherein the phenolic group represented by X in the general formula:

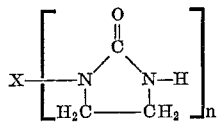

is a group whose molecular weight is from about 100 to about 5,000 and wherein $n$ is a number greater than 1. Preferably $n$ is a number from 2 to 5 but may range as high as 15 or 20 and polymers of this type are also curable by this technique.

Basically, the unique curing method contemplated by this invention comprises the steps of first adding a strong acid catalyst to a resin of the above-described type and then adding an aldehyde to the mixture. Curing and hardening occurs almost instantaneously and the resin may be removed from its mold right after the curing step is completed. Cured films and coatings may be obtained by exposing the resin-catalyst mixtures to aldehyde vapors or mixtures of gases containing an aldehyde.

The catalyst used may be any well-known catalyst which will operatively effect a rapid cure. Examples of such catalysts are strong organic and inorganic acids such as sulfuric acid, hydrochloric acid, perchloric acid, phosphoric acid, polyphosphoric acid, boron trifluoride, boron trifluoride etherate, trifluoroacetic acid, trichloroacetic acid, hydrobromic acid, p-toluenesulfonic acid, sulfurous acid, and aluminum chloride. Sulfuric acid is an especially preferred catalyst. It, as well as the other acids, are generally added in an amount of about 1 to about 60 parts by weight catalyst per 500 parts by weight resin. They are then thoroughly mixed with the resin to provide a dispersed composition ready for curing.

The curing step, as stated above, comprises contacting a gaseous aldehyde or a mixture of gases containing an aldehyde with films or coatings of the resin-catalyst composition prepared in the first step of the unique process of this invention. It is most advantageous although not critical that the aldehyde vapors permeate throughout the uncured article in order to effect a maximum amount of cure in the shortest possible time. For this reason sufficient gas pressures are used to effect good gas permeation but these pressures are not so great as to effect an undue amount of foaming or bubbling of the final product. Where foaming is undesirable, simple contact of the gas with the resin composition in film form has proved sufficient for most purposes. An excess of aldehyde gas may be used without deleterious effects on the hardness and strengths of the articles.

It may be advantageous in some instances to flush the hardened article with air or other inert gas or to place the article in a vacuum to remove excess aldehyde which may remain in the film or coating article after gassing. This reduces the problems of toxicity and odor associated with the subsequent handling of the ultimate article produced.

The articles prepared by the above-described process, although they rapidly achieve a high degree of useful strength, actually build up additional strength on standing at room temperatures for short periods of time. Post-baking, if desired, may also be used to build up additional strength.

A variety of aldehydes or mixtures of aldehydes may be used to rapidly cure the resin-catalyst sysem. Particularly useful are acetaldehyde, formaldehyde, propionaldehyde, butyraldehyde, acrolein, and crotonaldehyde. The preferred aldehyde is acetaldehyde.

Although the actual gassing step may assume many forms and various designs, the preferred method of gassing involves passing a current of air or inert gas, e.g. nitrogen, through or over a liquid aldehyde to provide a gas mixture saturated with aldehyde vapor. This gaseous mixture is then blown over the resin-catalyst composition either at atmospheric pressure or at pressures up to about 300 lb. per square inch. The liquid aldehyde in the above-described group may be heated to increase their vapor pressure and warm gas mixtures blown over the composition. Such heating also helps to effect higher strength cures. Alternately, the aldehyde vapors may be passed over the composition without the aid of a carrier gas. For example, in those instances when formaldehyde is used, paraformaldehyde is pyrolyzed and the hot formaldehyde gas is passed directly over the composition.

When aldehyde saturated air vapors are used in the process of this invention, it may be advantageous to add small amounts of inhibitors to the aldehyde in order to prevent autoxidation of the aldehydes to their corresponding carboxylic acids. Examples of useful inhibitors are hydroquinone, quinone, dinitrobenzene, and α-naphthol.

As described above, the resins suitable for the rapid cold-setting technique of this invention are those ethylene urea terminated phenolic resins which have more than one ethylene urea terminating group and thus more than one unreacted >NH group. Although not limited to any specific theory, it is believed that the presence of unreacted >NH groups coupled with the unique basic structure of the ethylene urea group itself causes or allows to be accomplished the extremely rapid cures of this invention. By "rapid" or "almost instantaneous cures" is meant a cross-linking of resin molecules to a sufficient degree within a period of approximately 50 seconds and preferably less than about 10 seconds, such that the structure is able to hold its shape and dimensions, and has a rigidity of sufficiently useful strength. In actual practice, many of the above resins when in film form have been found to cure in approximately 10 seconds or less.

As alluded to hereinabove, the types of articles which may be produced from the novel cured resins of this invention are great in both number and variety. Generally speaking, these resins, with or without additives as described above may be used as adhesives, insulators, encapsulators, films, laminates, all types of castings, extruded articles, building structures and the like.

The following examples serve to more fully illustrate the unique nature of the curing method of this invention.

EXAMPLE VIII

One hundred parts of the product of Example II is mixed with 10 parts of 50% aqueous sulfuric acid. This mixture is coated onto aluminum panels by dipping the panels in the resin solution and allowing the excess resin to run off or by knife coating to give thin films. The coated panels are placed in a chamber containing air saturated with acetaldehyde. After 30 seconds exposure, the films are tack free. A complete cure is obtained on standing at room temperature.

EXAMPLE IX

Five grams of the product of Example I, 1.5 grams of a 40% aqueous solution of glyoxal and 0.05 gram of concentrated hydrochloric acid are mixed in an aluminum dish. The mixture is placed in an oven at 120° C. for a period of two minutes and then allowed to cool to room temperature. A tough well cured tan colored casting is obtained.

EXAMPLE X

Ten parts of the product of Example II is mixed with 0.8 part of concentrated HCl. To the mixture is added 1.6 parts of acrolein. The mixture gels in 10 seconds after mixing and a hard casting is obtained at room temperature.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A method of curing a resin characterized by the formula:

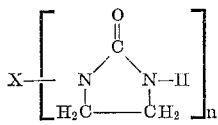

wherein X represents a phenolic resin structure attached to a nitrogen atom of the ethylene urea through a methylene group, and $n$ is an integer greater than 1 which comprises mixing said resin with a curing catalyst and thereafter contacting said mixture with a gas containing an aldehyde for a sufficient period of time to at least partially cure said resin.

2. A method according to claim 1 wherein said curing catalyst is selected from the group consisting of organic and inorganic acids.

3. A method according to claim 1 wherein said curing catalyst is selected from the group consisting of sulfuric acid, hydrochloric acid, perchloric acid, phosphoric acid, polyphosphoric acid, boron trifluoride, boron trifluoride etherate, trifluoroacetic acid, trichloroacetic acid, hydrobromic acid, p-toluenesulfonic acid, sulfurous acid, and aluminum chloride.

4. A method according to claim 1 wherein said aldehyde gas comprises an aldehyde selected from the group consisting of acetaldehyde, formaldehyde, propionaldehyde, butylraldehyde, acrolein, crotonaldehyde and mixtures thereof.

5. A method according to claim 1 wherein said temperature of cure is room temperature and said time of gas contact is less than 50 seconds.

6. A method according to claim 1 wherein said time of gas contact is less than 10 seconds.

7. A method according to claim 1 which also includes the step of flushing said cured resin of excess entrained aldehyde gas.

8. A method according to claim 1 wherein said aldehyde gas is entrained in a second gas.

9. A method according to claim 1 wherein said second gas is air and an inhibitor for preventing autoxidation of the aldehyde gas is added to the gas.

10. A method of curing a resin as recited in claim 1 and wherein said resin has a molecular weight between about 100 and about 5000 which comprises forming a mixture of said resin with a curing catalyst and contacting said mixture with an aldehyde gas for a sufficient period of time to at least partially cure said resin.

11. A method according to claim 10 wherein said resin is first dissolved in a liquid solvent to form a solution and said curing catalyst is added to the solution.

12. A method according to claim 10 wherein said aldehyde gas is formaldehyde gas formed by the pyrolysis of paraformaldehyde.

13. A method according to claim 10 wherein said gas comprises a mixture of an aldehyde, air, and an inhibitor for preventing autoxidation of said aldehyde.

14. A method according to claim 10 which also includes the step of post-baking said resin to increase its strength.

15. A method according to claim 10 which also includes the step of flushing said cured resin of excess aldehyde gas after said curing is effected.

16. A method of curing the ethylene urea terminated phenolic resin of claim 1 wherein said phenolic resin has a molecular weight of about 100 to about 5000 and has at least two ethylene urea terminating groups attached thereto which comprises dissolving said resin in a solvent to thereby form a solution, adding to said solution an acid catalyst, casting said solution into a resin article, contacting said solution with an aldehyde containing gas at room temperature for a sufficient period of time to cure said resin, flushing excess gas and solvent from said resin and post-baking said resin into a strong, cast, article.

References Cited

UNITED STATES PATENTS

| | | | |
|---|---|---|---|
| 1,892,848 | 1/1933 | Ostersetzer et al | 260—57 |
| 3,058,849 | 10/1962 | Bakke et al. | 117—139.4 |
| 3,525,379 | 8/1970 | Johnson et al. | 164—16 |

OTHER REFERENCES

Chem-Abstracts, vol. 59, 1963, 7720h, 7721a, Tokyo Shibaura Electric.

HOWARD E. SCHAIN, Primary Examiner

U.S. Cl. X.R.

260—59